(12) United States Patent
Tomonaga

(10) Patent No.: US 7,599,200 B2
(45) Date of Patent: Oct. 6, 2009

(54) ELECTRIC POWER CONVERTER

(75) Inventor: Shinzo Tomonaga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 390 days.

(21) Appl. No.: 10/574,014

(22) PCT Filed: Sep. 30, 2003

(86) PCT No.: PCT/JP03/12498

§ 371 (c)(1),
(2), (4) Date: Mar. 29, 2006

(87) PCT Pub. No.: WO2005/034326

PCT Pub. Date: Apr. 14, 2005

(65) Prior Publication Data

US 2007/0115701 A1      May 24, 2007

(51) Int. Cl.
*H02M 5/40* (2006.01)
*H02J 3/00* (2006.01)
*H02M 5/45* (2006.01)

(52) U.S. Cl. .......................................... 363/34; 363/37
(58) Field of Classification Search ......... 323/318–354; 363/24, 34, 41, 95, 37, 74, 78, 79
See application file for complete search history.

(56) References Cited

U.S. PATENT DOCUMENTS 5,268,832 A * 12/1993 Kandatsu ..................... 363/95
5,497,289 A * 3/1996 Sugishima et al. .......... 361/709
5,790,391 A * 8/1998 Stich et al. .................... 363/24
6,335,870 B1 * 1/2002 Sakurai ......................... 363/34
6,414,858 B1 * 7/2002 Giannopoulos ............... 363/41
7,026,784 B2 * 4/2006 Shimizu et al. ......... 318/400.26

FOREIGN PATENT DOCUMENTS

| JP | 3-261877 A | 11/1991 |
| JP | 03-261877 A | 11/1991 |
| JP | 06-153586 A | 5/1994 |
| JP | 6-190752 A | 7/1994 |
| JP | 07-194144 A | 7/1995 |
| JP | 11-27949 A | 1/1999 |
| JP | 11027949 | * 1/1999 |
| JP | 2002-354300 A | 12/2002 |

OTHER PUBLICATIONS

Japanese Office Action dated Jun. 30, 2009, with partial English translation.

* cited by examiner

*Primary Examiner*—Adolf Berhane
*Assistant Examiner*—Jue Zhang
(74) *Attorney, Agent, or Firm*—Sughrue Mion, PLLC

(57) ABSTRACT

In an electric power converter, a main circuit unit and a control unit are detachably attached to each other, and another control unit differing in a control manner can be newly attached to the single main circuit unit.

Moreover, the main circuit unit includes a storage unit that stores at least characteristics concerning the main circuit unit, calibration values with respect to the various detectors, a production history, an operation history, and specifications.

7 Claims, 5 Drawing Sheets

ELECTRIC POWER CONVERTER

TECHNICAL FIELD

The present invention relates to an electric power converter.

BACKGROUND ART

Generally, an electric power converter that, drives an alternate current (AC) load at an arbitrary frequency includes a main circuit unit and a control unit. The main circuit unit includes a switching unit that performs switching from a direct current (DC) voltage (which includes a DC voltage generated from an AC voltage) to an AC voltage having an arbitrary frequency and that outputs the AC voltage. The control unit controls a switching element that is a component of the switching unit based on information concerning the operation of a preset load and information transmitted from various detectors included in the main circuit unit so that the switching element reaches a desired ON/OFF operational state.

Electric power converters that perform open-loop control with ease or products that perform closed-loop control with high accuracy so that a user can use the product in a control manner according to a purpose are available. These products are prepared for various powers ranging from small power of several watts to large power of several thousand kilowatts. Thus, flexible responses can be offered to the diverse needs of users. The control manner according to a purpose is realized by the control unit. The necessary power is realized by the main circuit unit.

In the electric power converter, characteristics of the main circuit unit, calibration values of various detectors provided in the main circuit unit, production history such as manufacturing date, operation history, specifications in addition to information concerning the operation of a load, are needed as initial values prepared beforehand for realizing a desired function. Herein, let characteristics of the main circuit unit, calibration values, a production history, an operation history, and specifications be called management information concerning the main circuit unit.

In a conventional electric power converter, a control unit includes a storage unit that stores information, such as that concerning the operation of a load, and hence management information concerning a main circuit unit is also stored in the storage unit included in the control unit.

Therefore, conventionally, the main circuit unit and the control unit are kept in a separated state from each other, and there is a need to store management information concerning the main circuit unit in the control unit when the main circuit unit and the control unit are combined together for shipment. Likewise, when the main circuit unit and the control unit, which have been separated from each other after having been combined together, are again combined together, there is a need to store management information concerning the main circuit unit in the control unit. Therefore, the combining work is troublesome.

When a change in function between a product that performs easy open-loop control and a product that performs highly accurate closed-loop control is made by changing the control unit into another, there is a need to temporarily upload management information concerning the main circuit unit to another storage device and then download the information to the newly provided control unit. Therefore, the function changing work is troublesome.

Usually, to advance the delivery date, products are beforehand produced and stored. However, conventionally, the main circuit unit and the control unit have been required to be produced in a one-to-one relationship, and hence the electric power converter has been required to be produced and stored for each capacity and in each control manner. This has caused an increase in the volume of inventories.

A possible solution to solve the problem is to provide a storage unit that stores management information concerning the main circuit unit in the main circuit unit. With respect to the solution, for example, Patent Document 1 discloses a head-separation type camera in which a camera head and a camera control unit that controls the camera head are detachably connected together, and the camera head is provided with a storage device that stores various data concerning the camera head, and the control unit stores the usage condition of the camera head in the storage device.

Additionally, for example, Patent Document 2 discloses an industrial-use robot in which the main body of the robot is provided with a model data setting unit, and a control unit determines the start of control based on consistency with the model data.

However, a difference lies between the significance of providing the storage unit in Patent Documents 1 and 2 and the significance of providing the main circuit unit with the storage unit in the present invention. Additionally, the conventional devices (Patent Documents 1 and 2) and the present invention are different in the character of information to be stored.

The Patent Documents 1 and 2 are as follows.

Patent Document 1: Japanese Published Unexamined Patent Application No. 2002-354300

Patent Document 2: Japanese Published Unexamined Patent Application No. H6-190762

This invention has been made in consideration of these circumstances. It is therefore an object of the present invention to provide an electric power converter capable of facilitating the combining work for combining a main circuit unit and a control unit together and the function changing work and capable of restricting an increase in the volume of inventories.

DISCLOSURE OF INVENTION

According to an aspect of the present invention, an electric power converter including a main circuit unit including a switching unit that performs switching from a DC voltage including a DC voltage generated from an AC voltage to an AC voltage having an arbitrary frequency and an arbitrary voltage and that outputs the AC voltage; and a control unit that controls a switching element that is a component of the switching unit based on information concerning an operation of a preset load and information emitted from various detectors included in the main circuit unit so that the switching element reaches a desired on/off operational state, wherein the main circuit unit includes a storage unit that stores at least characteristics concerning the main circuit unit, calibration values with respect to the various detectors, a production history, an operation history, and specifications.

According to the present invention, when the main circuit unit and the control unit that have been stored in a state of being separated from each other and are combined together for shipment, and when the main circuit unit and the control unit that have been separated from each other after having been combined together and are again combined together, there is no need to store characteristics of the main circuit unit, calibration values, a production history, an operation history, and specifications in the control unit, and hence the main circuit unit and the control unit can be easily combined together. Additionally, when a change in function is made according to the change from the control unit to another, there is no need to temporarily upload characteristics of the main circuit unit, calibration values, a production history, an operation history, and specifications to another storage device and no need to download these data to the newly provided control unit, and hence a change in function can be easily made. Additionally, one of various control units differing in the control manner can be detachably attached to a single main circuit unit, and hence the inventory of the electric power converters can be greatly reduced.

BEST MODE(S) FOR CARRYING OUT THE INVENTION

Exemplary embodiments of an electric power converter according to the present invention will be hereinafter described in detail with reference to the accompanying drawings.

First Embodiment

Figure 1:
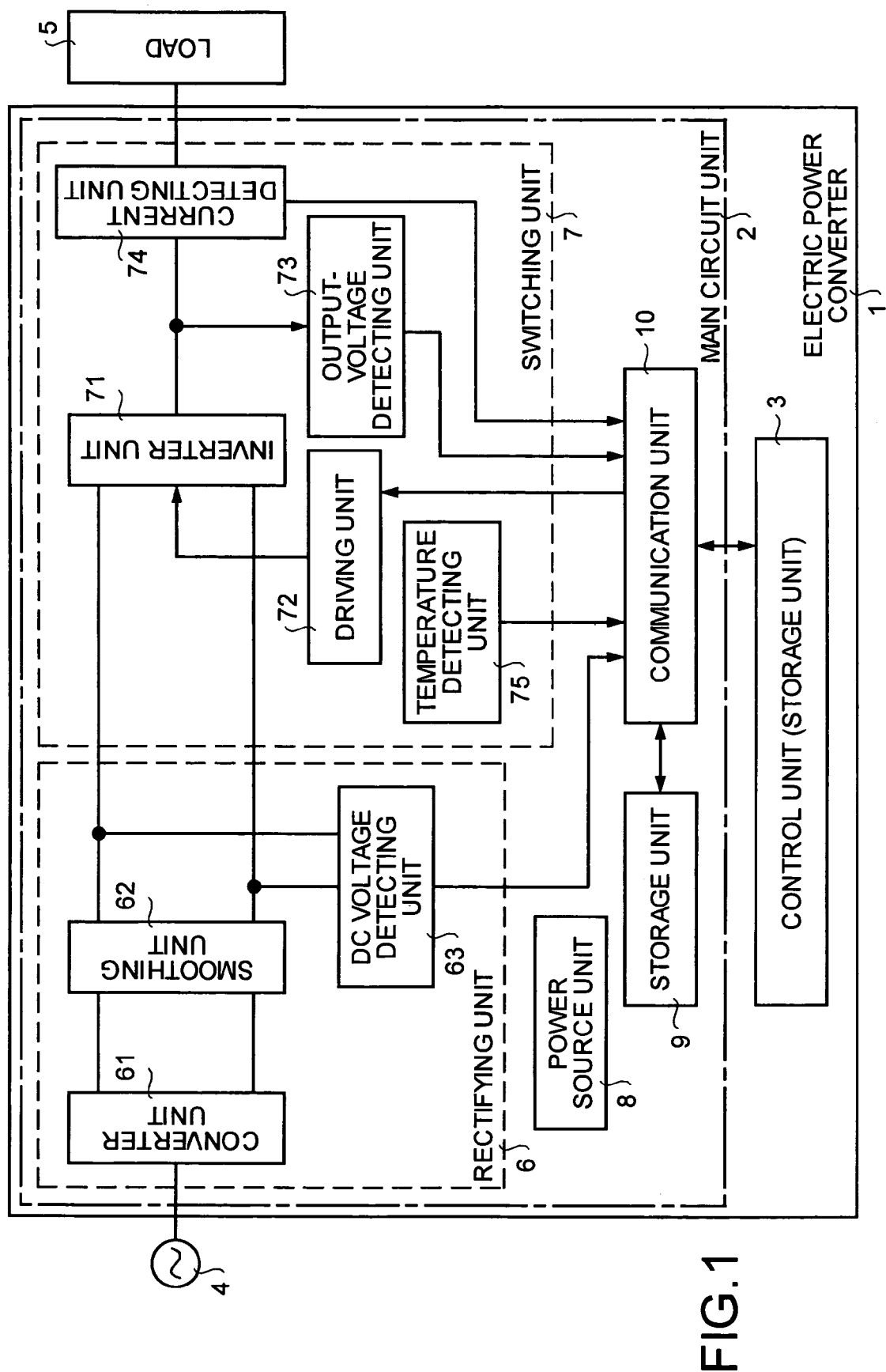
FIG. 1 is a block diagram of an electric power converter according to a first embodiment of the present invention.

FIG. 1 is a block diagram of a structure of the electric power converter according to a first embodiment of the present invention. The electric power converter 1 shown in FIG. 1 is made up of a main circuit unit 2 and a control unit 3. The electric power converter 1 generates an AC voltage, which is arbitrary in frequency and voltage, from a commercial AC power source 4, and supplies the voltage to a load 5.

The main circuit unit 2 includes a rectifying unit 6, a switching unit 7, a power source unit 8, a storage unit 9, and a communication unit 10. The main circuit unit 2 and the control unit 3 are housed in mutually independent cases, respectively, and transmit necessary information to each other through the communication unit 10.

The rectifying unit 6 includes a converter unit 61 that converts the AC voltage of the commercial AC power source 4 into a DC voltage, a smoothing unit 62 that smoothes the DC voltage converted by the converter unit 61, and a DC voltage detecting unit 63 that detects the DC voltage smoothed by the smoothing unit 62 and outputs the DC voltage to the communication unit 10.

The switching unit 7 includes an inverter unit 71 that performs switching from the DC voltage smoothed by the smoothing unit 62 to an AC voltage having an arbitrary frequency by an on/off operation using a plurality of switching elements and outputs the AC voltage to the load 5, a driving unit 72 that drives the switching elements that are components of the inverter unit 71, an output-voltage detecting unit 73 that detects the AC voltage outputted by the inverter unit 71 and outputs the AC voltage to the communication unit 10, a current detecting unit 74 that detects an electric current flowing between the inverter unit 71 and the load 5 and outputs the electric current to the communication unit 10, and a temperature detecting unit 75 that detects the temperature of the switching unit 7 and outputs the temperature to the communication unit 10.

The power source unit 8 generates voltages various in level from the DC voltage smoothed by the smoothing unit 62, and supplies the voltages to the control unit 3, the storage unit 9, the communication unit 10, and the driving unit 72.

The storage unit 9 comprises of a nonvolatile memory such as electronic erasable programmable read-only memory (EEPROM), and prestores characteristics of the main circuit unit 2, calibration values with respect to various detecting units (the DC voltage detecting unit 63, the output-voltage detecting unit 73, the current detecting unit 74, and the temperature detecting unit 75), the production history of the main circuit unit 2, a use history in which use-environment information is incorporated into each operation history of the rectifying unit 6, the switching unit 7, and the power source unit 8, lifetime information calculated from the use history, and specifications.

In other words, in the embodiment, the use history and the lifetime information concerning the components of the main circuit unit 2 are added as management information concerning the main circuit unit 2 so that operations can be performed more accurately.

The communication unit 10 reads the calibration values with respect to the detecting units, the production history of the main circuit unit 2, and each use history and each lifetime information of the rectifying unit 6, the switching unit 7, and the power source unit 8 from the storage unit 9, and sends these data to the control unit 3 according to (1) the output of a driving signal emitted from the control unit 3 to the driving unit 72, (2) the transmission of detection signals emitted from the DC voltage detecting unit 63, the output-voltage detecting unit 73, the current detecting unit 74, and the temperature detecting unit 75 to the control unit 3, and (3) a request emitted from the control unit 3.

Communication between the communication unit 10 and the control unit 3 may be performed through a parallel communication method or a synchronous or asynchronous serial communication method. The parallel communication method enables high-speed communication. If data lines are used in the serial communication method, the number of the data lines can be reduced. A connection method without data lines (e.g., optical communication or radio communication) can, of course, be employed. A setting operation with respect to the storage unit 9 can be performed through the communication unit 10. The communication unit 10 provided with these functions can be constructed of, for example, a processing circuit including application specific integrated circuit (ASIC) or central processing unit (CPU) that is a dedicated semiconductor integrated circuit.

The storage unit included in the control unit 3 can be a nonvolatile memory such as EEPROM, and prestores setup information such as setting for driving the load 5 (e.g., the operating mode of the load 5) or setting for display. From the contents of the storage unit 9 obtained by a request to the communication unit 10, the setup information stored in the storage unit included in the control unit 3, and the detection signals of the detecting units of the main circuit unit 2 sent from the communication unit 10, the control unit 3 determines the control of the main circuit unit 2, and sends a driving signal to the main circuit unit 2, for example, when the operation starts.

A control unit of a type that performs easy open-loop control or a control unit of a type that performs highly accurate closed-loop control while feeding back the operational state of the load 5 can be used as the control unit 3. These types are selected according to the purpose of use. The relationship between the main circuit unit and the control unit will be hereinafter described with reference to FIG. 2 and FIG. 3.

Figure 2A:
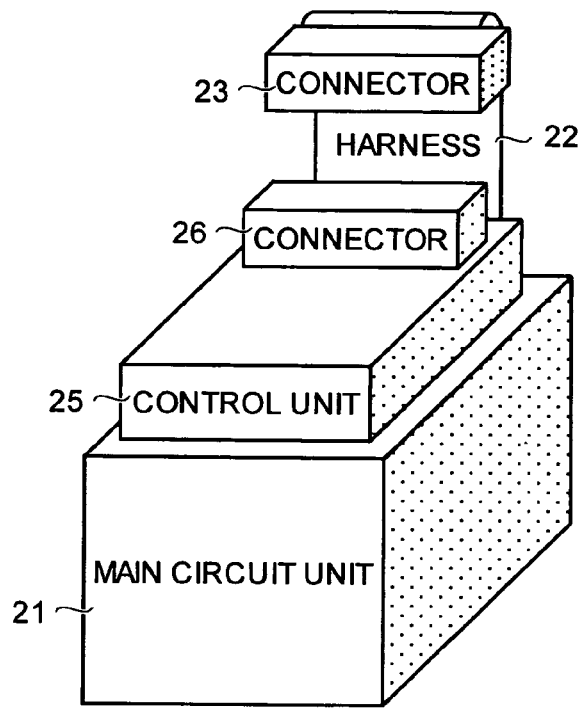
FIGS. 2A and 2B are conceptual diagrams of the connection relationship between a main circuit unit and a control unit of the electric power converter shown in FIG. 1.
Figure 2B:
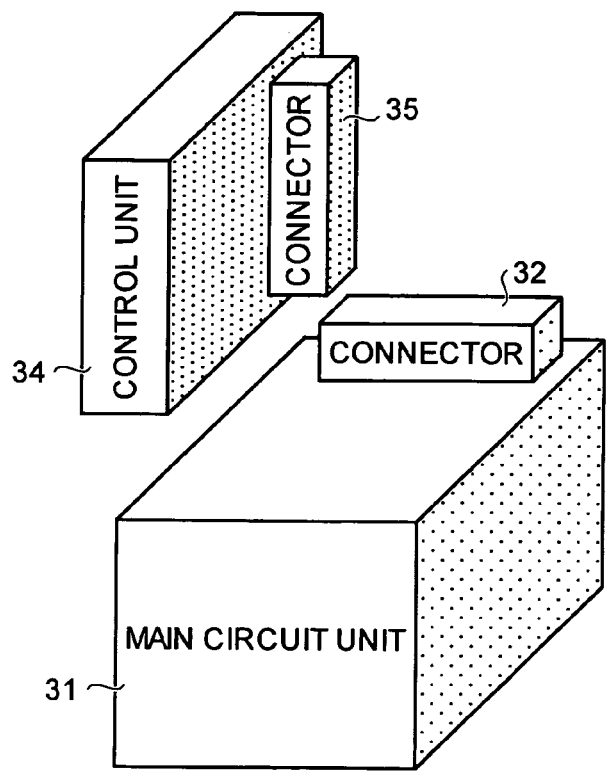

FIGS. 2A and 2B are conceptual diagrams of the connection relationship between the main circuit unit and the control unit in the electric power converter shown in FIG. 1. A connection example using a harness and connectors is shown in FIG. 2A. In detail, a connection portion formed by attaching a connector 23 to an end of a harness 22 that is a data line is prepared in a main circuit unit 21. A connector 26 is disposed on a side wall surface of a control unit 25. The control unit 25 is united with the main circuit unit 21 in such a way as to fix the other side wall surface of the control unit 25 opposite to the side wall surface on which the connector 26 is disposed to a side wall surface of the main circuit unit 21, for example, by tightening a screw. An electric connection between the main circuit unit 21 and the control unit 25 is made by connecting the connectors 23 and 26 together.

A connection example using only connectors is shown in FIG. 2B. In detail, a connector 32 is disposed on a side wall surface of a main circuit unit 31. A connector 35 is disposed on a side wall surface of a control unit 34. The control unit 34 is united with the main circuit unit 31 in such a way as to fix the side wall surface of the control unit 34 on which the connector 35 is disposed to the side wall surface of the main circuit unit 31 on which the connector 32 is disposed, for example, by tightening a screw. Simultaneously, the connectors 32 and 35 are connected together, and hence an electric connection is made between the main circuit unit 31 and the control unit 34.

Although the connection method using the connectors is shown in FIGS. 2A and 2B, a soldering method may be employed without using the connectors. Alternatively, a connection method using the optical communication or the radio communication described above may be employed.

In the electric connection (i.e., the combination of the main circuit unit and the control unit) described above, there is no need to store characteristics of the main circuit unit, calibration values, a production history, a use history, lifetime information, etc., in the control unit, and hence the combining work is greatly simplified. Additionally, the main circuit unit and the control unit can be stored and delivered in a state of being separated from each other, and can be installed by being combined together by the hand of a user.

To allow a user to operate the electric power converter in a control manner according to a purpose, a product that performs easy open-loop control or a product that performs highly accurate closed-loop control can be used as the electric power converter. The control manner according to the purpose is realized by the control unit. The electric power converter is prepared for each capacity ranging from a small capacity of several watts to a large capacity of several thousand kilowatts. The necessary capacity is realized by the main circuit unit.

In this case, in the embodiment, it becomes possible to easily combine the control unit having an arbitrary control manner and the main circuit unit having an arbitrary capacity together. Therefore, it becomes possible to easily make a change in function according to the replacement of the control unit by another.

Figure 3:
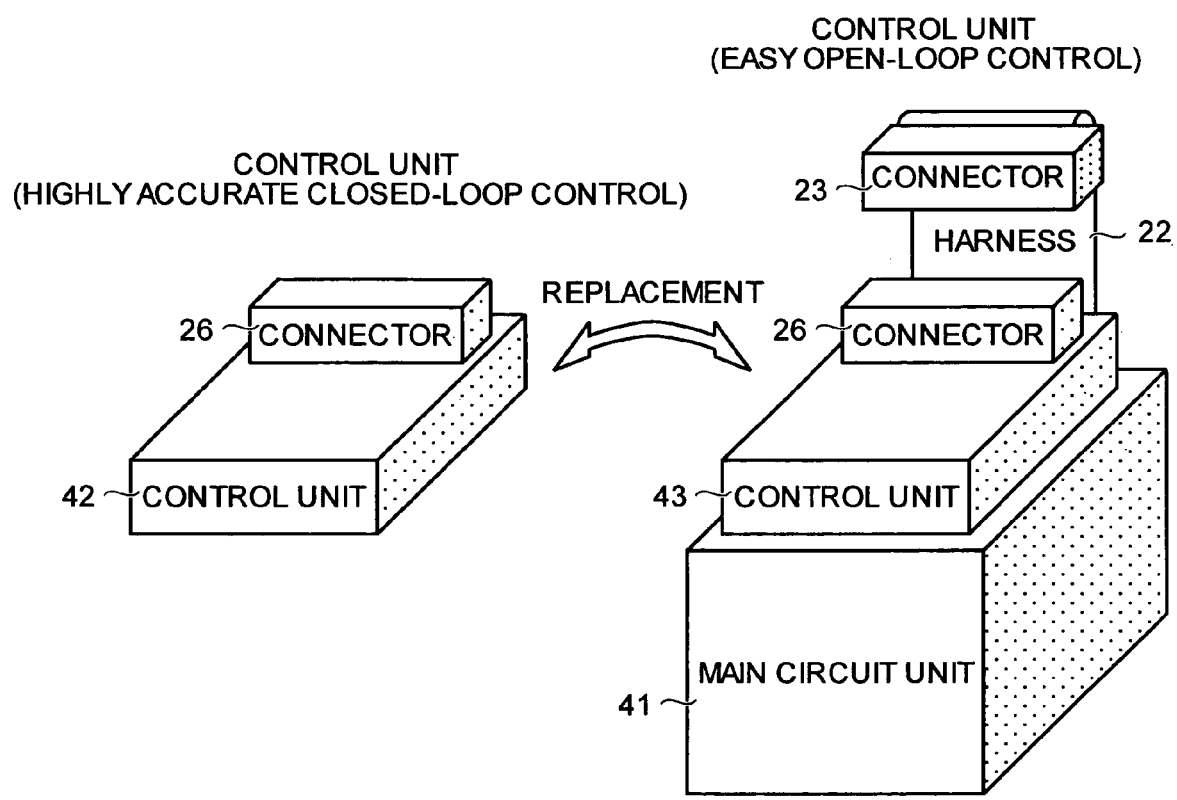
FIG. 3 is a schematic diagram of the replacement of the control unit according to a purpose in the electric power converter shown in FIG. 1.

FIG. 3 is a schematic diagram of the replacement of the control unit according to a purpose in the electric power converter shown in FIG. 1. In FIG. 3, a control unit 43 that performs easy open-loop control is mounted on a main circuit unit 41 having a certain capacity, for example, if the connection method of FIG. 2A is used. When the necessity of changing the function arises by replacing the control unit 43 with a control unit 42 that performs highly accurate closed-loop control, all that is required is to merely replace the control unit 43 that performs easy open-loop control with the control unit 42 that performs highly accurate closed-loop control, because a storage unit is included in the main circuit unit 41. Therefore, there is no need to temporarily upload information including the characteristics of the main circuit unit 41, the calibration values, the production history, the use history, lifetime information, etc., to another storage device and download these pieces of information to the newly provided control unit 42, and hence the change in function can easily made.

Therefore, according to the embodiment, there is no need to construct an electric power converter by combining a control unit having a control manner according to a purpose, such as a control unit that performs easy open-loop control or a control unit that performs highly accurate closed-loop control, with a main circuit unit having a capacity ranging from a small capacity of several watts to a large capacity of several thousand kilowatts, and no need to manufacture, store, and deliver the electric power converter.

Additionally, when the main circuit unit is combined with the control unit having a control manner according to a purpose, there is no need to store characteristics of the main circuit unit, calibration values, a production history, a use history, lifetime information, etc., depending on the combination. Therefore, it becomes possible to combine an arbitrary main circuit unit with the control unit. As a result, the total stock of the electric power converters to be stored can be reduced to less than half.

From the standpoint of a user, these features mean that upgrading can be easily performed. Therefore, according to the embodiment, an electric power converter with excellent usability can be provided.

Second Embodiment

Figure 4:
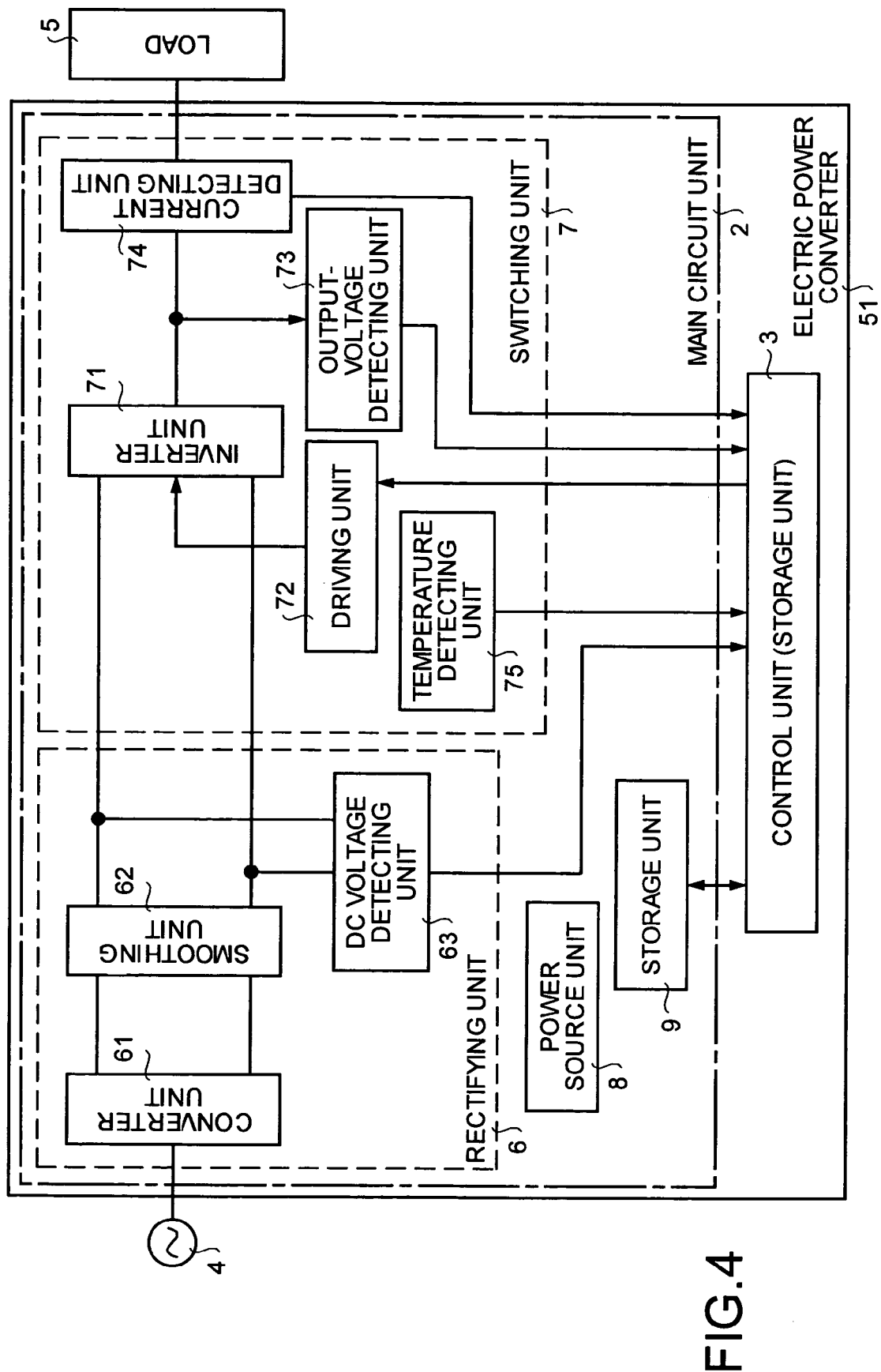
FIG. 4 is a block diagram of a structure of an electric power converter according to a second embodiment of the present invention.

FIG. 4 is a block diagram of a structure of an electric power converter according to a second embodiment of the present invention. In FIG. 4, the same reference numeral as in FIG. 1 (first embodiment) is given to the same or equivalent component. Herein, a description is provided centering about a part relative to the second embodiment.

As shown in FIG. 4, in the electric power converter 51 according to the second embodiment, the communication unit 10 is omitted in the structure shown in FIG. 1 (first embodiment), and a signal of each unit of the main circuit unit 2 is directly connected to the control unit 3 by one-to-one correspondence. The same operation and effect as in the first embodiment can be obtained by the structure.

Third Embodiment

Figure 5:
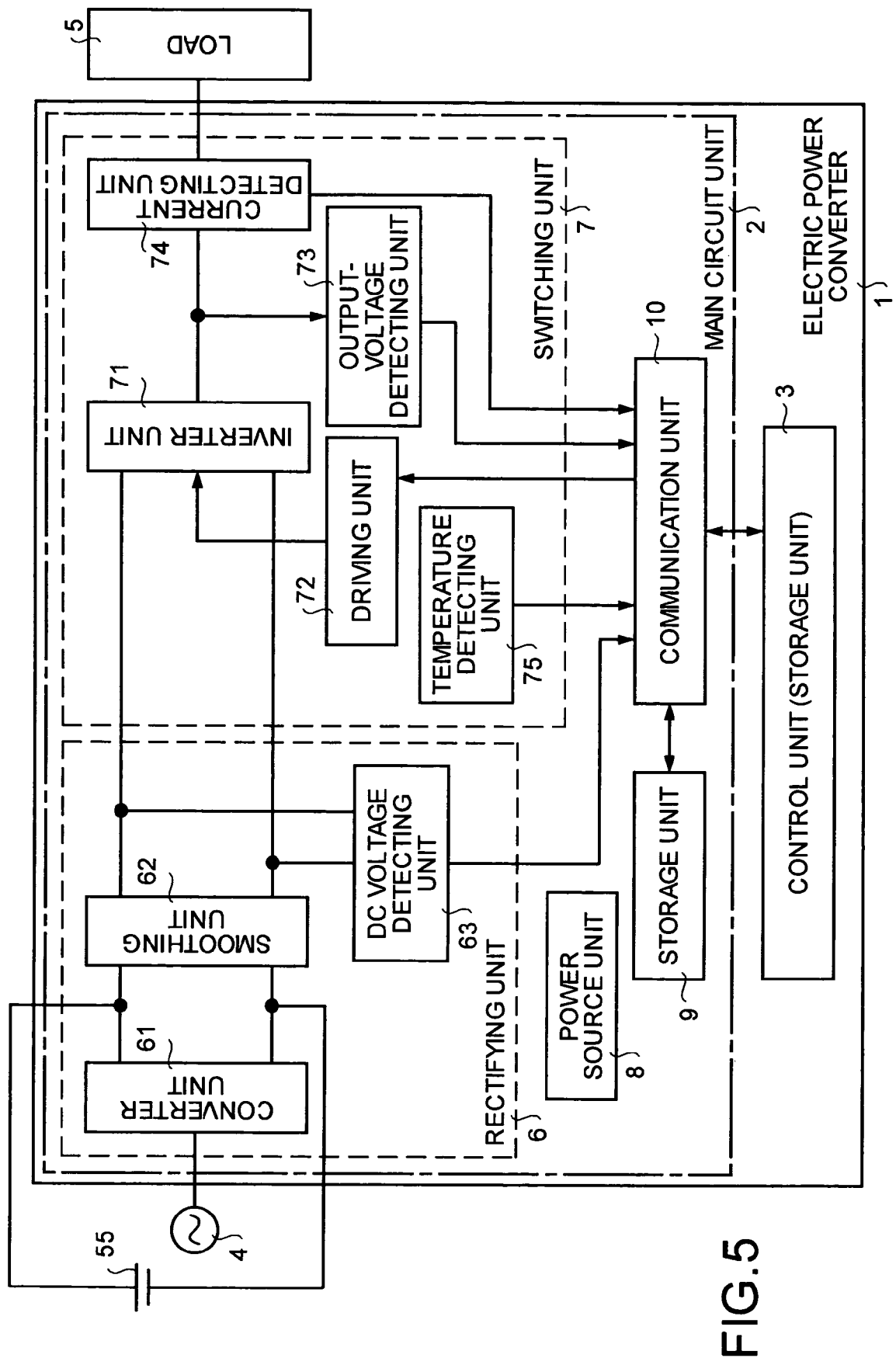
FIG. 5 is a block diagram of a structure of an electric power converter according to a third embodiment of the present invention.

FIG. 5 is a block diagram of a structure of an electric power converter according to a third embodiment of the present invention. In FIG. 5, the same reference numeral as in FIG. 1 (first embodiment) is given to the same or equivalent component. Parts that relate to the third embodiment have only been explained below.

As shown in FIG. 5, in the third embodiment, a DC power source 55 is provided in parallel with the converter unit 61 at an input terminal of the smoothing unit 62 in the electric power converter 1 shown in FIG. 1 (first embodiment). Although the DC power source 55 is a backup power source, a power source that can supply DC power can be likewise connected. As a result, in the electric power converter designed to be uninterruptible, the same operation and effect as in the first embodiment can be obtained.

Although an example applied to the first embodiment is shown in the third embodiment, it is obvious that the example is also applicable to the electric power converter shown in the second embodiment. Additionally, as speculated from the third embodiment, it is possible to structure an electric power converter in which the converter unit 61 is omitted and in which only the DC power source 55 is used. The thus structured electric power converter is, of course, included in the present invention.

INDUSTRIAL APPLICABILITY

The present invention can facilitate the work of combining a main circuit unit and a control unit together and the function changing work. Therefore, the present invention is suitable for an electric power converter capable of meeting various needs of users with less volume of inventories, and is suitable for an electric power converter capable of allowing users to easily upgrade the converter.

The invention claimed is:

1. An electric power converter comprising:
    a main circuit unit comprising:
        a converter unit configured to convert a first alternating current (AC) voltage into a direct current (DC) voltage;
        a switching unit comprising a switching element configured to convert the DC voltage into a second AC voltage, wherein the second AC voltage has an a frequency value and a voltage value, and the second AC voltage is supplied to a load;
        a first storage unit configured to store at least: characteristics of the main circuit unit, calibration values of a plurality of detectors, a production history, an operation history, and specifications of the main circuit unit; and
        the plurality of detectors; and
    a control unit comprising a second storage unit configured to prestore setup information, wherein the setup information includes a setting for driving the load, which includes an operating mode of the load or a setting for display,
    wherein the control unit is configured to control the switching element to reach a desired on or off state based on: information concerning an operation of the load preset by the second storage unit, and information provided by the plurality of detectors,
    wherein the main circuit unit and the control unit are detachably attached to each other such that the control unit can be replaced with another control unit which is of a different type than that of the control unit.

2. The electric power converter according to claim 1, wherein the plurality of detectors further comprise a current detecting unit configured to detect an electric current flowing between the switching element and the load.

3. The electric power converter according to claim 1, wherein the plurality of detectors further include:
    an output voltage detecting unit configured to detect the second AC voltage;
    a DC voltage detecting unit configured to detect the DC voltage; and
    a temperature detecting unit configured to detect a temperature of the switching unit.

4. The electric power converter according to claim 1, further comprising a communication circuit configured:
    to receive the production history and the operation history from the first storage unit; and
    to send the calibration values of the plurality of detectors to the control unit.

5. The electric power converter according to claim 1, wherein the main circuit further comprises a harness having a first connector attached thereto,
    wherein the control unit further comprises a second connector which is disposed on a side wall surface of the control unit, the control unit being united to the main circuit unit, and
    wherein the main circuit unit and the control unit are electrically connected by connecting the first connector and the second connector.

6. The electric power converter according to claim 1, wherein the main circuit further comprises a first connector disposed on a side wall surface of the main circuit unit,
    wherein the control unit further comprises a second connector disposed on a side wall surface of the control unit,
    wherein the side wall surface of the control unit is configured to be brought into contact with the side wall surface of the main circuit as the first connector is simultaneously brought into contact with the second connector, thereby creating an electric connection between the control unit and the main circuit unit.

7. The electric power converter according to claim 1, wherein the control unit performs open-loop control, and the another control unit performs closed-loop control.

* * * * *